United States Patent
Rasool

(10) Patent No.: US 10,616,660 B2
(45) Date of Patent: Apr. 7, 2020

(54) AUTOMATIC DETECTION OF TICKER SPEED

(71) Applicant: Sling Media Pvt. Ltd., Marathahalli, Bangalore (IN)

(72) Inventor: Mohammed Rasool, Bangalore (IN)

(73) Assignee: SLING MEDIA PVT. LTD., Bangalore (IN)

(*) Notice: Subject to any disclaimer, the term of this patent is extended or adjusted under 35 U.S.C. 154(b) by 0 days.

(21) Appl. No.: 15/940,785

(22) Filed: Mar. 29, 2018

(65) Prior Publication Data
US 2019/0306586 A1 Oct. 3, 2019

(51) Int. Cl.
*G06F 17/00* (2019.01)
*H04N 21/488* (2011.01)
*G06F 3/0485* (2013.01)
*G06K 9/00* (2006.01)
*G06F 3/01* (2006.01)

(52) U.S. Cl.
CPC ......... *H04N 21/4886* (2013.01); *G06F 3/013* (2013.01); *G06F 3/0485* (2013.01); *G06K 9/00221* (2013.01)

(58) Field of Classification Search
CPC .................................................. G06F 16/9577
See application file for complete search history.

(56) References Cited

U.S. PATENT DOCUMENTS

| | | | |
|---|---|---|---|
| 8,271,865 B1* | 9/2012 | Bennett | G06F 16/337 715/201 |
| 8,629,939 B1* | 1/2014 | Freund | H04N 5/145 348/468 |
| 2004/0049784 A1* | 3/2004 | Grzeczkowski | H04N 5/44543 725/46 |
| 2008/0052742 A1 | 2/2008 | Kopf et al. | |
| 2008/0059145 A1* | 3/2008 | Wood | G09B 19/06 704/2 |
| 2009/0222754 A1 | 9/2009 | Phillips et al. | |
| 2012/0054672 A1* | 3/2012 | McDowell | G09B 17/003 715/784 |
| 2012/0124456 A1* | 5/2012 | Perez | G06Q 30/02 715/200 |
| 2013/0232444 A1* | 9/2013 | Hegde | G06F 3/0485 715/785 |
| 2014/0223462 A1* | 8/2014 | Aimone | A61B 5/0476 725/10 |

* cited by examiner

*Primary Examiner* — Andrew T McIntosh
(74) *Attorney, Agent, or Firm* — Seed IP Law Group LLP

(57) ABSTRACT

Embodiments are directed towards presenting text along with video content to a user at a speed specific for that user. Various features regarding the user and the text, such as how fast the user can read, the user's native language, the language of the text, user speed selection, user profile information, or other characteristics of the user or text, are determined and utilized to select a speed at which to display text to the user. The text is then presented along with the video content such that the text moves on the screen at the selected speed.

23 Claims, 8 Drawing Sheets

AUTOMATIC DETECTION OF TICKER SPEED

BACKGROUND

Technical Field

The present disclosure relates generally to displaying audiovisual content to a user, and more particularly, but not exclusively, to providing scrolling text in an informational banner to the user at a speed specific for the user.

Description of the Related Art

Today, many news and sports channels include tickers and other informational banners to present additional information to a user beyond the main content of the channel. The text presented in such tickers is often static and changes all at once, or it scrolls along the bottom of the screen. The speed at which the ticker scrolls is generally set by the content distributor. However, if the speed is too fast, then a user may not be able to read all of the information presented, but if the speed is too slow, then the user may get bored and stop watching. It is with respect to these and others considerations that the embodiments have been made.

BRIEF SUMMARY

Briefly stated, embodiments are directed towards customizing the speed at which text in an informational banner, such as a ticker, is presented, along with video content, to a user. In general, the video content and the text are received at a server computer or at a content receiver. A speed at which to present the text to the user is determined. The text, along with the video content, is then presented to the user at the determined speed by scrolling the text across the screen in the informational banner. Determining the speed at which to scroll the text across the screen as it is presented to the user may include, for example, selecting a speed identified in a user profile, receiving a user selection, analyzing the user's reading speed, analyzing the user's expressions while viewing the text, determining a difference between the native language of the user and the language of the text, determining how complex or detailed the text is, or some combination thereof, as described in more detail below.

By customizing the speed at which to present the text to the user, the user can more efficiently follow and read the text. Such customization can be beneficial to users whose native language is different than the language of the text, allows for slower readers to keep up with the text, allows for faster readers to consume additional text, allows for multiple versions of the text to be presented on the screen at the same time for multiple users that have different reading capabilities, etc., which results in an improved computing system for providing visual content to users.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
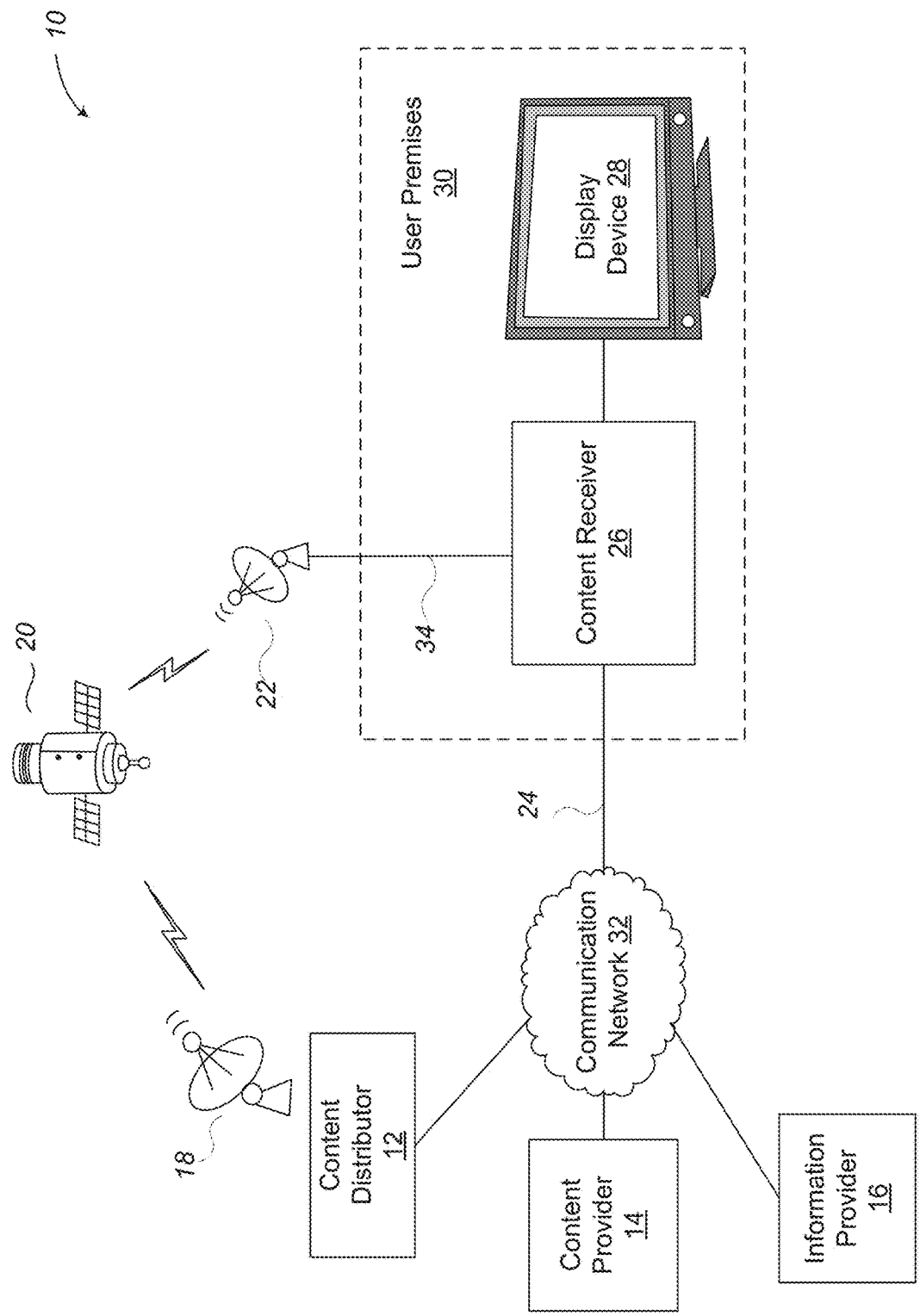
FIG. 1 illustrates a context diagram for providing audiovisual content to a user in accordance with embodiments described herein.

FIG. 1 shows a context diagram of one embodiment for providing audiovisual content to a user in accordance with embodiments described herein. Example 10 may include content provider(s) 14, information provider(s) 16, content distributor 12, communication networks 32, and user premises 30.

Content distributor 12 provides content and text to content receiver 26 for presentation on display device 28 to one or more users of display device 28 and content receiver 26 on user premises 30. As described in more detail below, the content distributor 12 or the content receiver 26 customize the speed at which the text is presented to the user(s). The content distributor 12 may provide the text and the content as separate data streams or as a single data stream where the text is metadata associated with the content.

The content may be video content, audio content, or audiovisual content. The text is visual content, typically words, letters, symbols or other readable information, that is presented, along with the content, to the user by scrolling the text horizontally or vertically across the screen of the display device 28. The scrolling text appears on the screen without input from the user, but at a speed that is customized for that user. The text is provided in form of an informational banner, which includes within its meaning any type of scrolling or moving text such as tickers, scrolling banner, crawler, marquee, or other types of moving text or data. Thus, while the informational banner is presented to the user by the content distributor 12 or some other source, the user may have some input and control over the speed at which the text moves across the screen. As can be appreciated, in many instances, the text that is within the informational banner will repeat over time. It might present a single message or phrase repeatedly, few phrases that then repeat, a few dozen phrases or even more. Thus, if a slow speed is selected, over a longer period time, the entire text message will eventually be presented to the user.

In some embodiments, the content distributor 12 determines the user-customized speed at which the text is to move across the screen of the display device 28. In at least one such embodiment, metadata associated with the distributed content or with the text may indicate the speed at which the display device 28 is to present the text to the user. In other embodiments, the content receiver 26 determines or modifies the user-customized speed at which the text is to move across the screen of the display device 28.

The content receiver 26 is a computing device that receives the content and the text from the content distributor 12. Examples of the content receiver 26 may include, but are not limited to, a set-top box, a cable connection box, a computer, or other content or television receivers. The content receiver 26 may be configured to provide the content to the user's display device 28, such as a television, monitor, or other display device. The content receiver 26 combines the content and the text such that the text is presented to the user, along with the content, at the determined speed for the user of content receiver 26. In some embodiments, the user of the content receiver 26 may also be referred to as the viewer of the display device 28. In some embodiments, there may be more than one user of the content receiver 26, or more than one viewer of the display device 28.

In general, the content distributor 12 obtains the content from the content provider 14, and the text from the information provider 16. In some embodiments, the content provider 14, the content distributor, or some other computing device, may provide the text. The content distributor 12 can provide the content and text to the content receiver 26 through a variety of different distribution mechanisms. For example, in some embodiments, the content distributor 12 may provide the content and text to the content receiver 26 directly through communication network 32 on link 24. In other embodiments, the content and text may be sent through uplink 18, which goes to satellite 20 and back to downlink station 22 of the user premises 30, and is then provided to the content receiver 26 via link 34.

Typically, the content provider(s) 14 generate, aggregate, and/or otherwise provide audiovisual content that is provided to one or more users. Sometimes, content providers are referred to as "channels." Examples of the content providers 14 may include, but are not limited to, film studios, television studios, network broadcasting companies, independent content producers such as AMC, HBO, Showtime, or the like, or other entities that provide content for user consumption. A content provider 14 may also include individuals that capture personal or home videos, and distribute these videos to others over various online media-sharing websites or other distribution mechanisms. The content provided by the content providers 14 may be referred to as the program content, which may include movies, sitcoms, reality shows, talk shows, game shows, documentaries, infomercials, news programs, sports broadcasts, or the like. In this context, program content may also include commercials or other television advertisements. It should be noted that the commercials may be added to the program content by the content providers 14 or the content distributor 12.

The information provider(s) 16 may create and distribute text, data, or other information that accompanies content distributed by the content distributor 12. In some embodiments, the data describes or supports the content, such as closed-captioning. In other embodiments, the data includes other un-related information, such as news updates, sports updates, breaking news, emergency information, or other types of text. In some embodiments, the content distributor 12 may combine or otherwise associate the text or data from the information provider 16 with the content from the content provider 14, which may be referred to as the distributed content. However, other entities may also combine or otherwise associate the content and other data together.

Although embodiments are described as the content provider 14 and the information provider 16 providing content and text, respectively, to the content distributor 12 for distribution to the content receiver 26, embodiments are not so limited. For example, in some embodiments, the content provider 14 may provide content directly to the content receiver 28 via the communication network 32. In other embodiments, the information provider 16 may provide text directly to the content receiver 26 via the communication network 32. In this way, the content receiver 26 can receive content and text via different communication mechanisms. For example, the content receiver 26 may receive content from the content distributor 12 via satellite 20, and text from the information provider 16 via the communication network 32. In at least one such embodiment, the content receiver 26 can select a display area or generate an informational banner with the text from the information provider 16 and overlay it onto the content received from the content distributor 12 independent of the content provided by the content distributor 12. In one non-limiting example, the content receiver 26 may receive content via a satellite cable provider and a news feed from an Internet website.

In some embodiments, the communication network 32 may be configured to couple various computing devices to transmit content/data from one or more devices to one or more other devices. For example, the communication network 32 may be the Internet, X.25 networks, or a series of smaller or private connected networks that carry the content and other data. The communication network 32 may include one or more wired or wireless networks.

Figure 2:
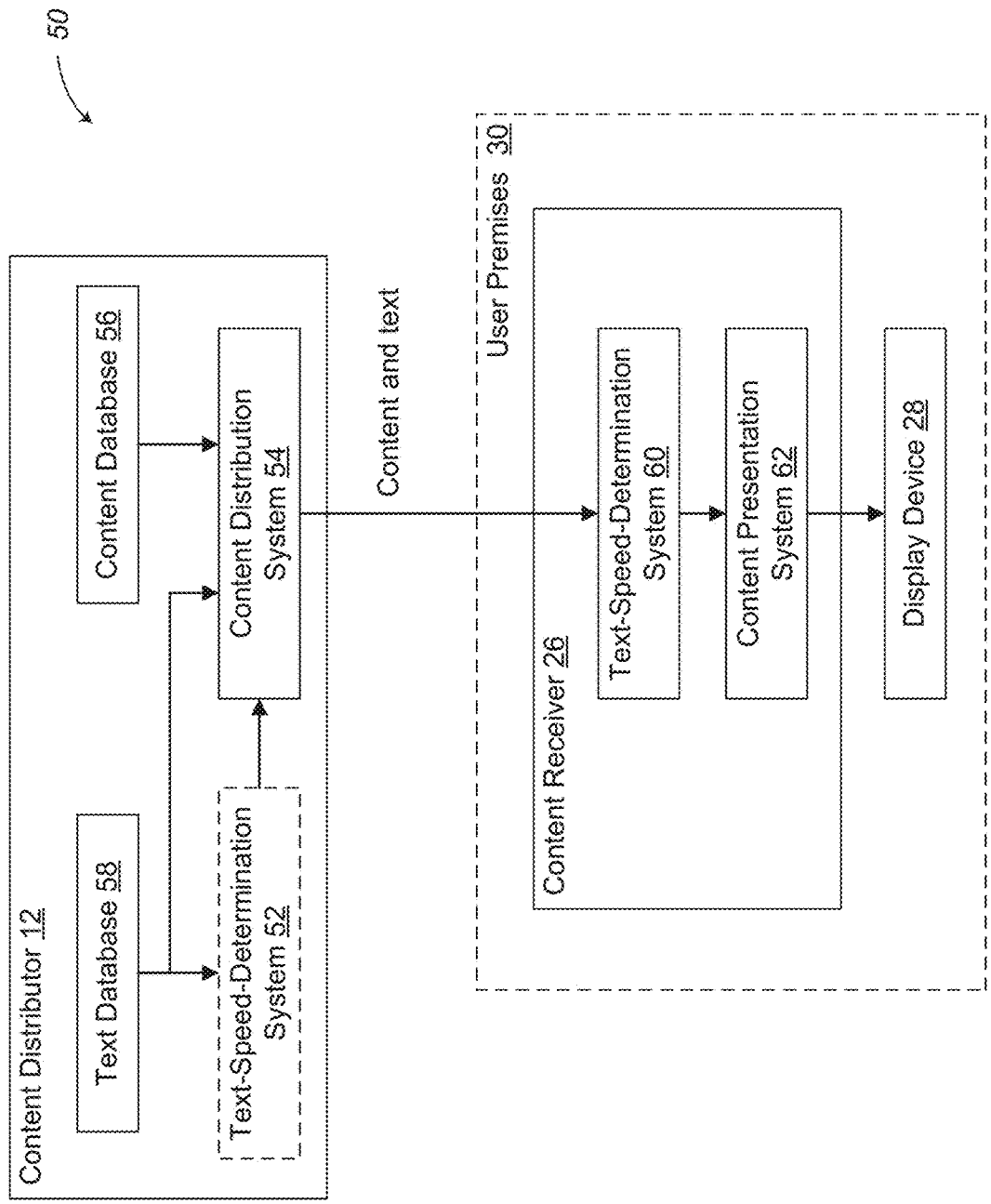
FIG. 2 illustrates a system diagram for presenting text at a customized speed, along with audiovisual content, to the user in accordance with embodiments described herein.

FIG. 2 illustrates a system diagram for presenting text at a customized speed, along with audiovisual content, to the user in accordance with embodiments described herein. System 50, similar to example 10 in FIG. 1, includes a content distributor 12 and a content receiver 26 at a user's premises 30. The various communication mechanisms between the content distributor 12 and the content receiver 26 are not illustrated in FIG. 2 for ease of illustration. Similarly, content distributor 12 and content receiver 26 include many other components and systems that provide other types of functionality, but are not shown or discussed in FIG. 2 for ease of discussion.

The content distributor 12 includes a text database 58, a content database 56, and a content distribution system 54. In some embodiments, the content distributor 12 may optionally include a text-speed-determination system 52, which is described in more detail below.

The content database 56 may store one or more different content items. The stored content may include content for one or more channels, on-demand content, streaming content, or other types of content that can be provided to content receiver 26.

The text database 58 may store one or more different text items. Each text item may include one or more words, phrases, or strings of readable text. For example, the text database 58 may include five news updates and five sports updates, each of which may be less than 150 characters. The text database 58 may store text for each of a plurality of different channels or content items, or it may store text that is independent of and unrelated to any specific channel or content item.

The content distribution system 54 communicates with the text database 58 and the content database 56 to select and obtain content and text to provide to the content receiver 26. In some embodiments, the content distribution system 54 may select the content and text based on a user selection, such as for a particular television channel or for a particular text feed, or a combination thereof. In other embodiments, a plurality of content and text may be obtained by the content distribution system 54 to be provided to the content receiver 26, such as by generating satellite signals that each includes content for a plurality of different channels.

In some embodiments, the content distribution system 54 may provide the content and the text to the content receiver 26 as separate data streams. In other embodiments, the content distribution system 54 may provide the content and the text in a single data stream with the text as embedded metadata.

The content receiver 26 includes a text-speed-determination system 60 and a content presentation system 62. The content presentation system 62 prepares the content and the text to be provided to the display device 28 for display to the user, with the text being presented at a speed determined by the text-speed-determination system 60 or, optionally, the text-speed-determination system 52 of the content distributor 12.

In some embodiments, the content presentation system 62 can select a display area or generate an informational banner to include the received text at the determined speed. Such an informational banner may scroll the text horizontally or vertically across the screen of the display device 28. The content presentation system 62 can combine the informational banner with the content, such as by overlaying the informational banner on the content, and provide the combined data stream to the display device 28.

The text-speed-determination system 60 determines the speed at which to present the text to the user. In various embodiments, the text-speed-determination system 60 may utilize user profiles, user sampling, user selection, user expressions, text characteristics, or user characteristics, or some combination thereof to determine the text speed, which are described in more detail below.

In some embodiments, the text-speed-determination system 60 stores a one or more user profiles for one or more users of the content receiver 26. Each corresponding profile includes an indication of a customized text speed for the corresponding user. The text-speed-determination system 60 receives an indication identifying which user is currently viewing the text. In some embodiments, the user may provide input, such as utilizing a graphical user interface to select the user's profile, input a user name or unique identifier, or provide other identifying input information to indicate that that user is currently viewing the text. In other embodiments, one or more images of the user may be captured and analyzed with facial recognition techniques to identify the user. In yet other embodiments, each of a plurality of users may have a corresponding mobile phone that includes a unique identifier. The content receiver can obtain this unique identifier, such as if the mobile phone is transmitting the identifier, when the user is in a threshold distance from the content receiver. The unique identifier can then be utilized to identify the user. Once the user is identified, a corresponding profile is selected, and the customized text speed associated with that profile is selected.

In other embodiments, the text-speed-determination system 60 may display preset text speed options to the user via display device 28. The user can then select one of the preset text speeds to use as the determined text speed.

In some other embodiments, the text-speed-determination system 60 may display standardized text to the user via the display device 28. The text-speed-determination system 60 can then time how long it takes the user to read the standardized text. For example, the user may utilize an interface to indicate when the user has started reading the standardized text and when the user has stopped. In another example, the content receiver 26 can utilize a camera to capture images of the user to determine when the user has started reading the standardized text and when the user stopped, such as by analyzing multiple images over time to identify eye movement of the user relative to a position on the screen of the display device. The time it took the user to read the standardized text and the number of words in the standardized text can be used to set the text speed.

In yet other embodiments, the text-speed-determination system 60 may analyze various images of the user while the text is being presented on the display device 28 to the user. For example, one or more facial recognition techniques may be employed to determine how the user's eyes are moving relative to the screen of the display device, or to identify various facial expressions that are indicative of the user's reading reactions. For example, if the text is too fast, the user's eyes may start to wander towards a left-hand side of the display screen, and then rapidly jump back to the right-hand side. This movement may be an indication that the user slowly fell behind the text as it moved across the screen, and then the user skipped reading part of the text to catch back up. Accordingly, this type of eye movement may indicate that the text is being presented too quickly, and that it should be slowed down. On the other hand, the user's facial expression may show signs of the user being bored, which can indicate that the text is being presented too slow, and that it should be sped up. In this way, the text-speed-determination system 60 can dynamically change the text speed as the user is viewing the text.

In other embodiments, the text-speed-determination system 60 analyzes the text to determine the text speed. In various embodiments, a genre, topic, technology, profession, word choice, language, or other characteristic of the text may be utilized to determine the text speed. For example, sport scores may have a faster text speed than a long quote by a political figure or a description that uses complex technology, legal, or medical terms. In various embodiments, the text may be assigned a score, such as a numerical value, based on the analysis. The score may indicate the speed at which the text is to be presented or applied against one or more thresholds to determine the text speed.

In some other embodiments, the text-speed-determination system 60 can utilize characteristics of the user to determine the text speed. For example, the user's profile may identify the age, schooling, reading level, comprehension level, geographical location, or native language of the user. Each of these characteristics, alone or in some combination, can be used to determine the text speed. For example, a college graduate with an engineering degree may have a lower or slower reading level than an English professor. One or more characteristics may be assigned a value, such that an aggregated score is utilized to determine the speed at which to present the text.

In at least one embodiment, one or more characteristics of the text may be compared to characteristics of the user based on the corresponding user profile. For example, if the user profile indicates that the user's native language is German, but the text is in English, then the text speed may be slower than if the user's native language was also English. As another example, text may include metadata that indicates a reading complexity level or a professional reading level indicating that the text is describing complex technology, legal concepts, medical procedures, etc. If the user's profile indicates that the person has a law degree, then text about legal concepts can be presented faster than text about medical procedures.

In various embodiments, the text or the user characteristics, or both, may be assigned a number value or score that can be used to determine the text speed. For example, if the text is describing complex technology, then it may have a higher score, e.g., 9 out of 10, whereas sports scores may have a lower score, e.g., 4 out of 10. Similarly, a college graduate may have a higher score, e.g., 6 out of 10, whereas a high-school graduate may have a lower score, e.g., 5 out of 10. The text-speed-determination system 60 may then employ one or more thresholds to determine the speed at which to present the text to the user. For example, if the score, i.e., the text characteristic score, user characteristic score, or average score, is above a 9, then the text speed may be set to a high text presentation speed, such as 120 words per minute. But if the scores are below a 4, then the text speed may be set to 180 words per minutes.

In some embodiments, the text speeds can be further adjusted based on combinations of characteristics, or on additional information in the user's profile. For example, if the user's language and the text language do not match, then the text speed may be reduced by a predetermined amount, such as by 20%. As another example, if the user profile indicates that the user has a high reading speed or knowledge of a particular subject or topic, then the text speed may be increased by a predetermined amount, such as by 5%.

Once the text speed is determined by the text-speed-determination system 60, then the text-speed-determination system 60 provides the determined text speed to the content presentation system 62, which prepares the content and the text to be presented to the display device 28 based on the determined text speed.

In some embodiments, the content receiver 26 may receive updates indicating that the users viewing the text has changed, such as by receiving additional user input or by analyzing additional images and identifying additional users. In some embodiments, the text-speed-determination system 60 determines a new or updated speed at which to present the text to the newly identified user. Once determined, the content presentation system 62 provides the content and the text to the display device, but with the text being presented at the updated speed.

If the previous user is still viewing the text along with the new user, then the content receiver 26 may employ priorities of the users to determine the text speed. For example, the user profile of the original user may indicate that it has a higher priority than the user profile of the new user. In this situation, the original text speed may be maintained. But if the new user's priority was higher, then a new text speed may be determined. In some other embodiments, an aggregate or average text speed may be determined based on the separate text speed for each user. In this way, the text is presented at a compromised speed between the determined text speeds for the different users.

In yet other embodiments, the content presentation system 62 may present separate versions of the text at the different text speeds, along with the content. For example, the content presentation system 62 may generate a first informational banner for the first user with the text being presented at a first speed determined for the first user, and may generate a second informational banner for the second user with the text being presented at a second speed determined for the second user. Both of these informational banners may then be combined with the content and provided to the display device 28. Such a combination of the informational banners and the content may include overlaying the informational banners on the content, or adjusting the size or aspect ratio of the content such that the informational banners are above, below, or next to the content without obstructing the content.

As described above, the content receiver 26 is determining the speed at which to present the text to the user. In some other embodiments, however, the content distributor 12 may determine the text speed. In some embodiments, the content distributor 12 may include the text-speed-determination system 52. The text-speed-determination system 52 may determine the speed at which the text is to be presented along with the content to the user, similar to the text-speed-determination system 60 of the content receiver 26.

In at least one such embodiment, after determining the text speed, the text-speed-determination system 52 provides the determined speed to the content distribution system 54. In some embodiments, the content distribution system 54 generates an informational banner to include the text at the determined speed. The content distribution system 54 can then combine the informational banner with the content, such as by overlaying the informational banner on the content, to be provided to the content receiver 26. In other embodiments, the content distribution system 54 may provide the content and the informational banner to the content receiver 26 as separate data streams. In yet other embodiments, the content distribution system 54 can provide the determined text speed, such as in metadata, along with the text and the content, to the content receiver 26. The content receiver 26 can then utilize the previously determined text speed to prepare and present the content and the text to the user with the text being presented at the determined text speed.

The operation of certain aspects of the invention will now be described with respect to FIGS. 3 and 4A-4B. In at least one of various embodiments, processes 70 and 100 described in conjunction with FIGS. 3 and 4A-4B, respectively, may be implemented by or executed on one or more computing devices, such as the content receiver 26 or the content distributor 12 in FIG. 1.

Figure 3:
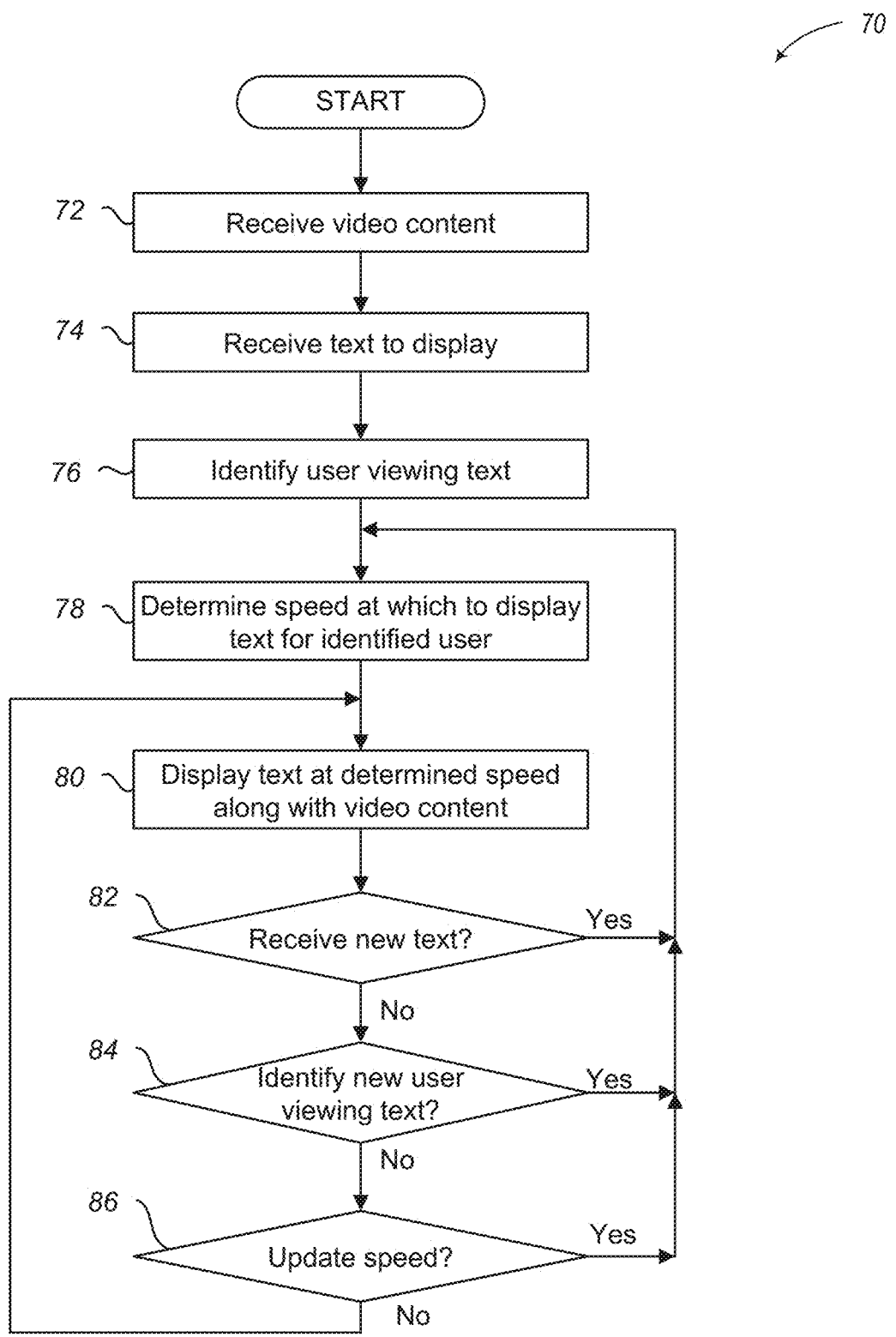
FIG. 3 illustrates a logical flow diagram generally showing an embodiment of an overview process for presenting text to a user at a determined speed in accordance with embodiments described herein.

FIG. 3 illustrates a logical flow diagram generally showing an embodiment of an overview process for presenting text to a user at a determined speed in accordance with embodiments described herein. As mentioned herein, the content receiver 26 or the content distributor 12, or a combination thereof, may perform embodiments described herein. As such, the following description does not specify which computing device is performing each action, unless specifically identified.

Process 70 begins, after a start block, at block 72, where video content is received. As mentioned herein, the content may be received at the content distributor 12 from one or more content providers 14, or the content may be received at the content receiver 26 from the content distributor 12. Process 70 proceeds to block 74, where text to display to a user is received. As mentioned herein, the text may be received at the content distributor 12 from one or more information providers 16, or the text may be received at the content receiver 26 from the content distributor 12 or the information providers 16.

Process 70 continues at block 76, where a user that is viewing the text is identified. In some embodiments, block 76 may be optional, and may not be performed. In various embodiments, a current user may be identified based on reception of an input from the user selecting a user profile associated with that particular user, or by analyzing images of the user using facial recognition to identify the user.

Process 70 proceeds next to block 78, where the speed at which to display the text is determined for the identified user, which is described in more detail below in conjunction with FIGS. 4A-4B. Briefly, however, the speed at which to present the text to the user may be determined or selected based on a user profile of the user, a user-selected speed, a speed at which the user reads standardized text, facial expressions of the user while reading the text, characteristics of the text, characteristics of the user, or other parameters, or various combinations thereof.

Process 70 continues next to block 80, where the text is displayed at the determined speed along with the video content. In some embodiments, one or more informational banners may be generated to present the text at the determined speed. The informational banner is combined with the content and provided to a display device for presentation to the identified user.

Process 70 proceeds to decision block 82, where a determination is made whether new text has been received. In various embodiments, the text may be provided every few seconds, such that the content receiver loops through the text. When the text changes, such as an update or a change in information, then the text may include an update flag that indicates the text now includes new information. In some embodiments, the content receiver may continually compare the new text to the previous text to identify if it has changed. If new or changed text has been received, then process 70 loops to block 78 to determine the speed at which to display the new text to the user; otherwise, process 70 flows from decision block 82 to decision block 84.

At decision block 84, a determination is made whether a new user is identified as now viewing the text. In various embodiments, a new user may provide input to the system indicating that they are now viewing the text and content. In other embodiments, images of the users may be analyzed using facial recognition to identify a change in the user. If a new user is identified as viewing the text, then process 70 loops to block 78 to determine the speed at which to display the text for the new user; otherwise, process 70 flows from decision block 84 to decision block 86. In some embodiments, decision block 84 may be optional, and may not be performed, and if no new text is received at decision block 82, then process 70 may flow from decision block 82 to decision block 86.

At decision block 86, a determination is made whether to update the speed at which the text is displayed to the user. In various embodiments, other factors may be utilized to determine if the text speed is to be updated, such as if the user provided input indicating that the text is being presented too fast or too slow. In another example, the speed may be updated based on a time of day (e.g., slower in the mornings and faster in the evening). If the speed is to be updated, then process 70 loops to block 78 to determine a new speed to present the text to the user; otherwise, process 70 loops to block 80 to continue to display the text at the current speed.

Figure 4A:
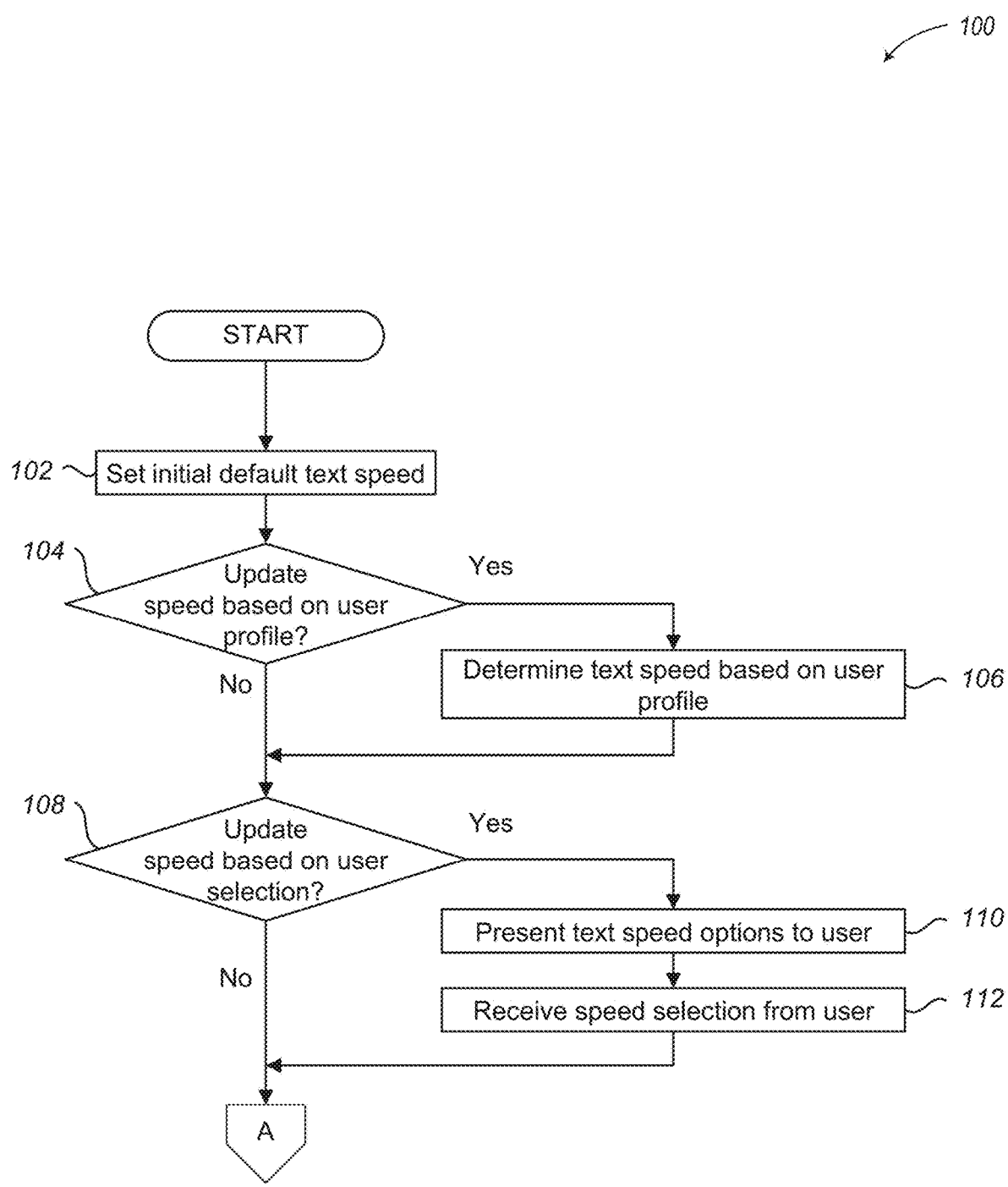
FIGS. 4A-4B illustrate a logical flow diagram generally showing an embodiment of a process for determining the speed at which to present the text to the user in accordance with embodiments described herein.
Figure 4B:
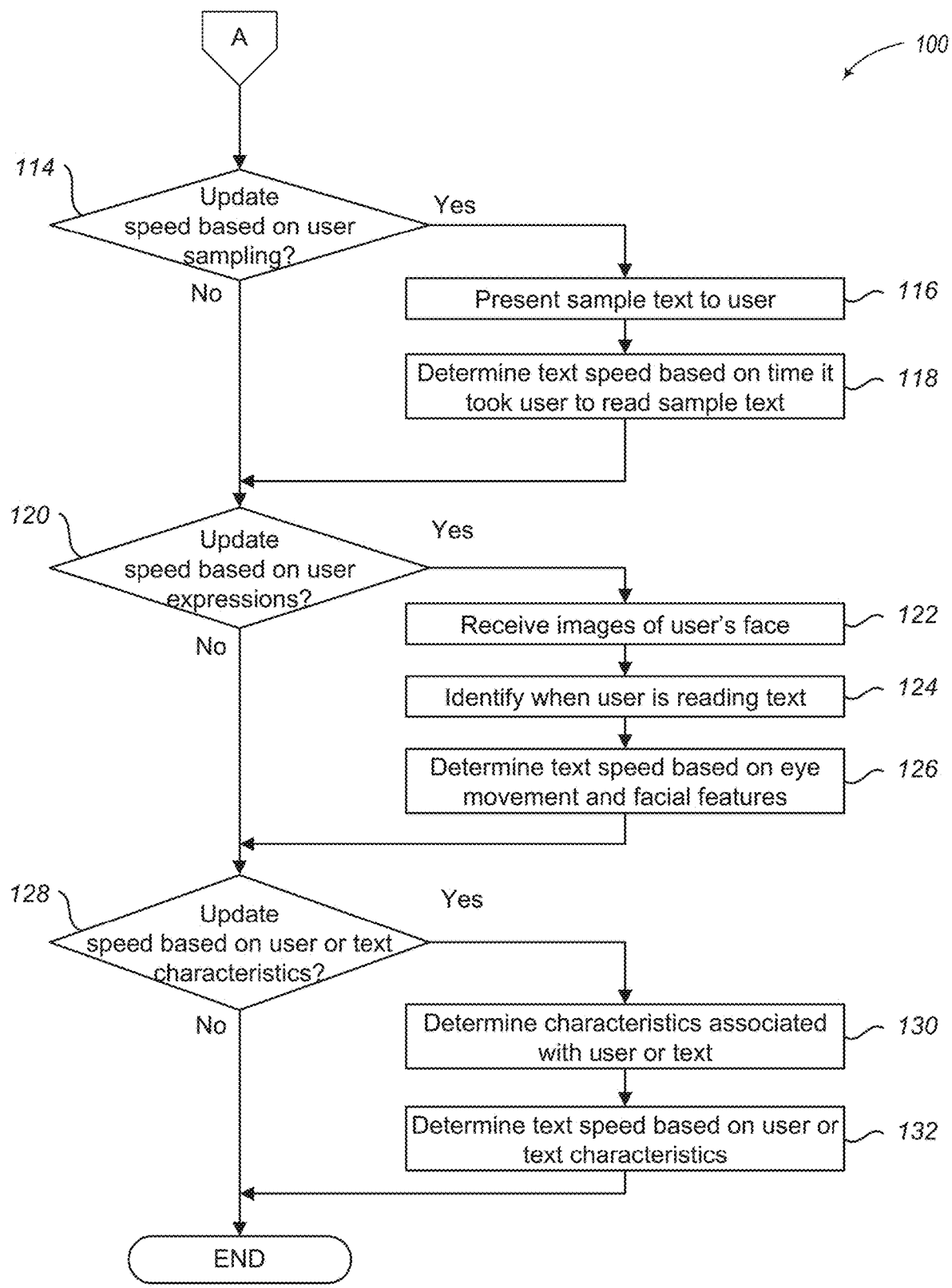

FIG. 4A-4B illustrate a logical flow diagram generally showing an embodiment of a process for determining the speed at which to present the text to the user in accordance with embodiments described herein.

Process 100 begins, after a start block in FIG. 4A, at block 102, where an initial default text speed is set. In various embodiments, this default speed may be set by the system designer or an administrator. In some embodiments, the text speed may not be initially set, but rather, the system may prompt the user to set the text speed.

Process 100 proceeds to decision block 104, where a determination is made whether a user profile is used to select text speed. If a user profile is to be used, then process 100 flows to block 106; otherwise, process 100 flows to decision block 108.

At block 106, the text speed is determined based on one or more user profiles. As described above, the user profile may indicate a customized text speed for the corresponding user that is viewing the text. After block 106, process 100 proceeds to decision block 108

If, at decision block 104, a user profile is not used to determine the text speed, then process 100 flows from decision block 104 to decision block 108. At decision block 108, a determination is made whether the user is to select the text speed. In some embodiments, the user may provide an input, such as via a remote control, indicating that the user is to input the text speed. If the user is to select the text speed, then process 100 flows to block 110; otherwise, process 100 flows to decision block 114 in FIG. 4B.

At block 110, a plurality of speed options are presented to the user via a display device.

Process 100 flows to block 112 to receive a speed selection from the user. In various embodiments, the user may utilize or navigate a graphical user interface to select a desired text speed. In at least one embodiment, as the user selects or tests different speed options, a set of sample texts may be presented to the user at that text speed. In at least one embodiment, the user may verify or accept the selected text speed. In at least one embodiment, the selected text speed is stored in a profile for the user. After block 112, process 100 proceeds to decision block 114.

If, at decision block 108, a user is not selecting the text speed, then process 100 flows from decision block 108 to decision block 114 in FIG. 4B. At decision block 114, a determination is made whether user sampling of reading speed is used to determine the text speed. In various embodiments, the user may provide an input, such as via a remote control, indicating that the user is to receive a sample text and time how fast they can read it. If user sampling is used, process 100 flows to block 116; otherwise, process 100 flows to decision block 120.

At block 116, sample text is presented to the user via the display device.

Process 100 proceeds to block 118, where the text speed is determined based on a time it took the user to read the sample text. In some embodiments, the user may click a button, such as via a remote control, indicating when they start reading the sample text and when the finish reading the sample text. In other embodiments, facial recognition may be used to determine when the user begins and finishes reading the sample text. The time between the beginning and finishing of reading the sample text is compared to the number of words in the sample text, which is then used to set the text speed. In some embodiments, the user may read different samples that are directed to different text characteristics, such as different topics, languages, complexity, etc. In at least one embodiment, the resulting text speeds are stored in a profile for the user. After block 118, process 100 proceeds to decision block 120.

If, at decision block 114, user sampling is not used to determine the text speed, then process 100 flows from decision block 114 to decision block 120. At decision block 120, a determination is made whether user expressions are used to determine the text speed. If user expressions are to be used to determine the text speed, then process 100 flows to block 122; otherwise, process 100 flows to decision block 128.

At block 122, images of the user's face are received while the text is being presented to the user.

Process 100 proceeds to block 124, where the user is identified as reading the text. In some embodiments, facial recognition techniques are utilized to determine the user's eye position and movement relative to the location of the text on the screen of the display device.

Process 100 continues at block 126, where the text speed is determined based on eye movement and facial features of the user in the received images. In some embodiments, the speed may be determined by whether the user's eyes stay fixed to a substantially similar area of the screen, such as within a three of four inch area near the text, or if they are constantly moving right to left, then jumping back to the right. A steady eye position may indicate that the text speed is accurate or too slow, whereas constant eye movement may indicate that the text speed to too fast. After block 126, process 100 proceeds to decision block 128.

If, at decision block 120, user expressions are not used to determine the text speed, then process 100 flows from decision block 120 to decision block 128. At decision block 128, a determination is made whether user or text characteristics are used to determine the text speed. If user or text characteristics are used to determine the text speed, then process 100 flows to block 130; otherwise, process 100 terminates or otherwise returns to a calling process.

At block 120, user or text characteristics are determined. In various embodiments, metadata associated with the text may be analyzed to determine various characteristics of the text, such a genre, topic, reading complexity, etc. In some embodiments, the text itself may be analyzed to determine one or more characteristics, such as the language of the text, complexity of words in the text, complexity or profession-centered words or topics, etc. Similarly, a user profile of the user may be utilized to identify one or more characteristics of the user, such as native language, reading level, schooling, profession, etc.

Process 100 proceeds to block 132, where the speed of the text is determined based on the user or text characteristics. In various embodiments, each text or user characteristic may be scored based on its complexity. A combination of the scores is used to determine the overall text speed. After block 132, process 100 terminates or otherwise returns to a calling process to perform further actions.

The determinations at decision blocks 102, 106, 112, 118, and 126 may be selected by the user, by an administrator, or preset by the system designer. Accordingly, in some embodiments, one or more of the decision blocks may not be performed. In other embodiments, multiple decision blocks may be performed such that the text speed is updated based on various results. For example, a user profile or user selection may be used to set an initial text speed, but the speed may then be modified or otherwise updated based on the user's expressions as they view the text, or the text or user characteristics.

Figure 5A:
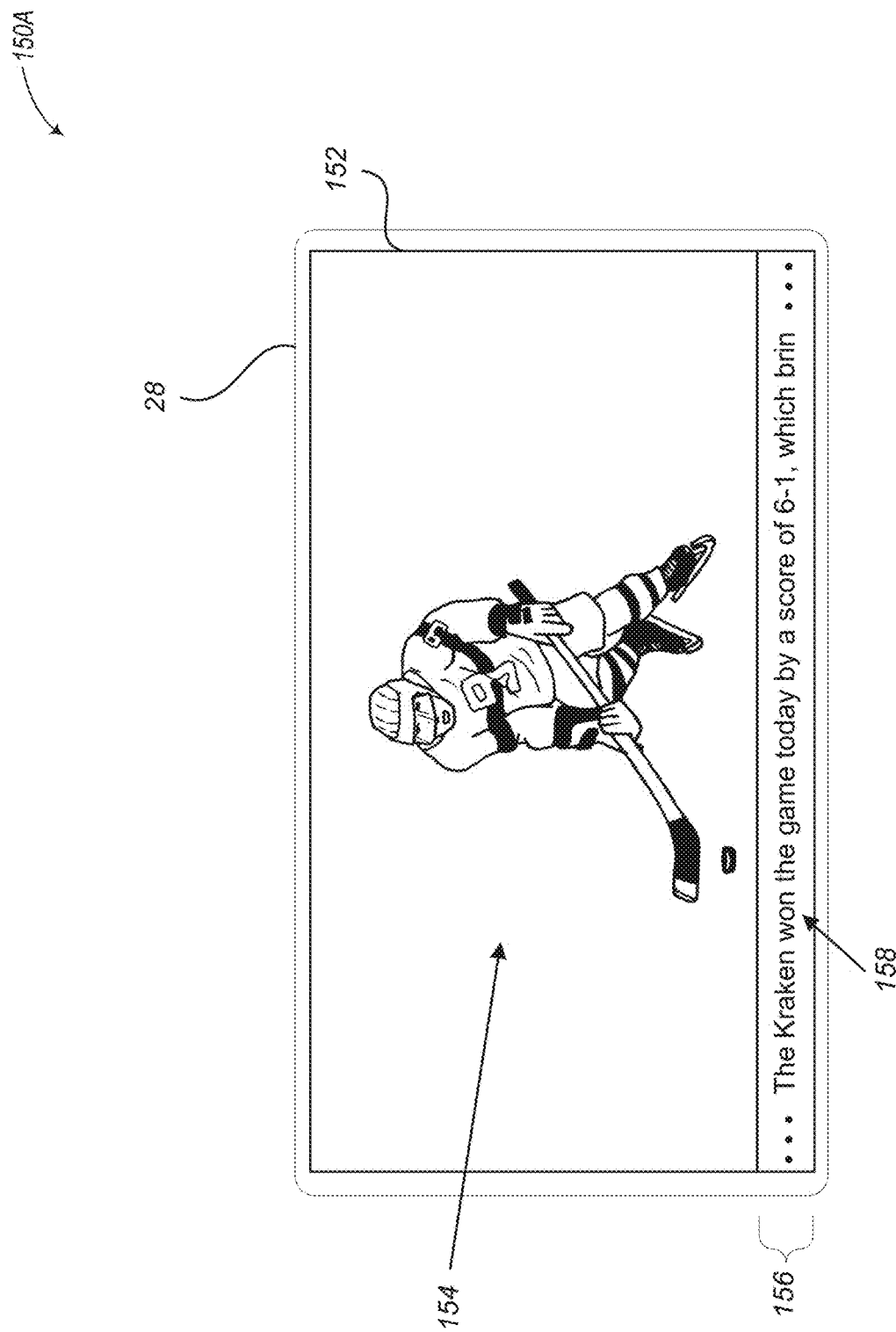
FIGS. 5A-5B show various use case examples of scrolling text in an informational banner in accordance with embodiments described herein.
Figure 5B:
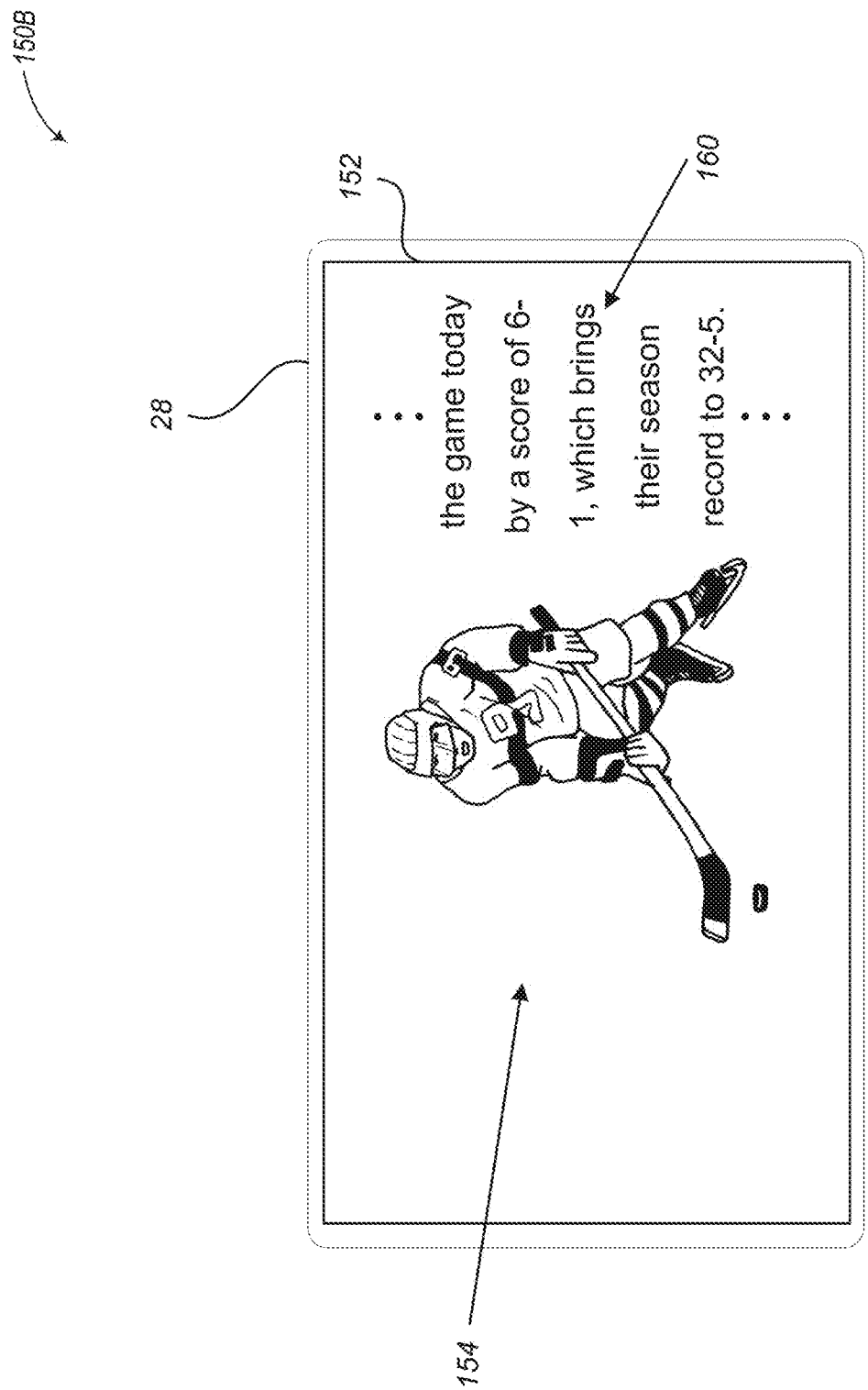

FIGS. 5A-5B show various use case examples of scrolling text in an informational banner in accordance with embodiments described herein. Example 150A in FIG. 5A illustrates a display device 28 with a screen 152. In this example, content 154 is being presented to the user of the display device 28. By employing embodiments described herein, an informational banner 156 is generated to include text 158, and is presented on the screen 152 below the content 154. The text 158 is scrolling horizontally across the screen 152 at the text speed customized for the user.

Example 150B in FIG. 5A illustrates an alternative example where text 160 is overlaid on the content 154. By employing embodiments described herein, the text 160 is presented on the screen 152 over the content 154. In this example, the text 160 is scrolling vertically across the screen 152 of the display device 28.

Figure 6:
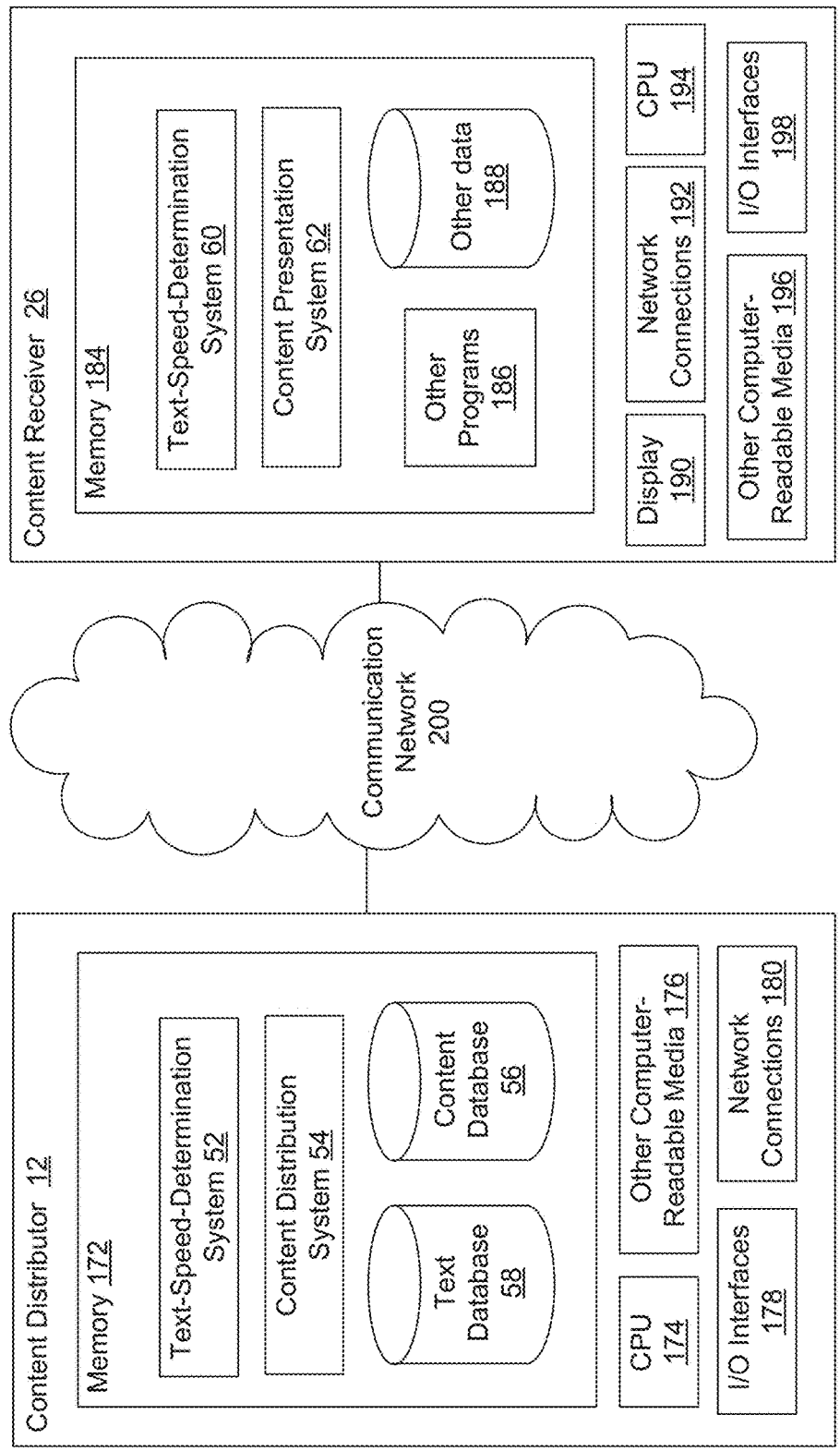
FIG. 6 shows a system diagram that describes an implementation of computing systems for implementing embodiments described herein.

FIG. 6 shows a system diagram that describes one implementation of computing systems for implementing embodiments described herein. System 170 includes content distributor 12 and content receiver 26.

The content distributor 12 provides content and text to content receiver 26 for presentation to a user or viewer of the content receiver 26. In some embodiments, the content distributor 12 determines a speed at which the text is to be presented to the user of the content receiver 26, as described herein. One or more special-purpose computing systems may be used to implement content distributor 12 to provide content and text to content receiver 26 and, in some embodiments, to determine the speed at which to present the text for the user. Accordingly, various embodiments described herein may be implemented in software, hardware, firmware, or in some combination thereof. The content distributor 12 may include memory 172, one or more central processing units (CPUs) 174, other computer-readable media 176, I/O interfaces 178, and network connections 180.

Memory 172 may include one or more various types of non-volatile and/or volatile storage technologies. Examples of memory 172 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 172 may be utilized to store information, including computer-readable instructions that are utilized by CPU 174 to perform actions, including embodiments described herein.

Memory 172 may have stored thereon text-speed-determination system 52 and content distribution system 54. Text-speed-determination system 52 may include one or more modules that determine the speed at which to present text to a user of content receiver 26, as described herein. Content distribution system 54 may include one or more modules to combine or otherwise provide the content and text to the content receiver 26, as described herein. Memory 172 may also store text database 58 and content database 56. Memory 172 may also store other programs or user data. For example, the memory 172 may store user data that contains details about the expected users of the system, including user profiles or other user information. Such user profiles may also be stored by a database or other computing system that is separate from the content distributor 12 and the content receiver 26.

The text database 58 may store one or more text items prior to providing them to the content receiver 26. Similarly, the content database 56 may store one or more content items.

Network connections 180 are configured to communicate with other computing devices, such as content receiver 26, or information providers or content providers (not illustrated), via communication network 200. I/O interfaces 178 may include a keyboard, audio interfaces, video interfaces, displays, or the like. Other computer-readable media 176 may include other types of stationary or removable computer-readable media, such as removable flash drives, external hard drives, or the like.

The content receiver 26 receives content and text from content distributor 12, and provides the content and the text to a display device (not illustrated) for presentation to a user or viewer of the content receiver 26. In some embodiments, the content receiver 26 determines a speed at which the text is to be presented to the user of the content receiver 26, as described herein. One or more special-purpose computing systems may be used to implement content receiver 26 to receive content and text and, in some embodiments, to determine the speed at which to present the text for the user. Accordingly, various embodiments described herein may be implemented in software, hardware, firmware, or in some combination thereof. The content receiver 26 may include memory 184, display 190, network connections 192, one or more central processing units (CPUs) 194, other computer-readable media 196, and I/O interfaces 198.

Memory 184 may include one or more various types of non-volatile and/or volatile storage technologies, similar to what is described above for memory 172. Memory 184 may be utilized to store information, including computer-readable instructions that are utilized by CPU 194 to perform actions, including embodiments described herein.

Memory 184 may have stored thereon text-speed-determination system 60 and content presentation system 62. Text-speed-determination system 60 may include one or more modules that determine the speed at which to present text to a user of content receiver 26, as described herein. Content presentation system 62 may include one or more modules to combine, or may otherwise provide the content and text to a display device for presentation to the user, as described herein. Memory 184 may also store other programs 186 and other data 188. For example, other data 188 may store content, text, user profiles, or other user information.

Network connections 192 are configured to communicate with other computing devices, such as content distributor 12 via communication network 200. I/O interfaces 198 may include a keyboard, audio interfaces, video interfaces, or the like. Other computer-readable media 196 may include other types of stationary or removable computer-readable media, such as removable flash drives, external hard drives, or the like. Display 190 may include a display device to display content and text or an interface that is configured to provide the content and text to a display device, such as display device 28 in FIG. 1.

In various embodiments, the communication network 200 may include communication network 32 in FIG. 1, or a satellite communication network, e.g., via uplink 18, satellite 20, and downlink station 22, to provide content and text from the content distributor 12 to the content receiver 26.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a first memory that stores a plurality of user profiles;
a server computer that includes:
a second memory that stores first computer instructions;
a first processor that performs first actions when executing the first computer instructions; the first actions comprising:
obtaining video content to present to a plurality of users;
obtaining text to present to the plurality of users along with the video content;
determining a plurality of characteristics for each respective user of the plurality of users from the user based on the plurality of user profiles;
assigning a reading-speed value to each of the plurality of characteristics for each respective user;
determining a reading speed for each respective user based on an aggregated score calculated from the reading-speed values of the plurality of characteristics for the respective user;
determining a speed at which to present the text to the plurality of users based on an average speed from the determined reading speed for each respective user; and
associating metadata that includes the determined speed with the text;
a receiver that includes:
a tuner that receives the video content and the text from the server computer for presentation to the plurality of users;
a third memory that stores second computer instructions;
a second processor that performs second actions when executing the second computer instructions; the second actions comprising:
identifying the speed at which to present the text to the plurality of users based on the metadata associated with the text;
generating an informational banner to present the text to the plurality of users at the identified speed;
combining the informational banner with the video content; and
providing the combined video content and informational banner to a display device to present the text to the plurality of users at the identified speed along with the video content.

2. The system of claim 1, wherein first memory is within the server computer.

3. The system of claim 1, wherein the first memory is within the receiver.

4. The system of claim 1, wherein the first processor of the server computer performs further first actions when executing the first computer instructions, the further first actions comprising:
receiving an update to the text;
determining an updated speed at which to present the updated text to the plurality of users; and
providing the updated text and the updated speed to the receiver.

5. The system of claim 1, wherein generating the informational banner includes:
determining a horizontal display area of the display device for the informational banner; and
scrolling the text horizontally through the display area at the determined speed.

6. The system of claim 1, wherein generating the informational banner includes:
determining a display area of the display device for the informational banner; and
scrolling the text vertically through the display area at the determined speed.

7. The system of claim 1, wherein the second processor of the receiver performs further second actions when executing the second computer instructions, the further second actions comprising:
receiving input from a user of the plurality of users to change the speed at which to present the text to the plurality of users;

modifying the identified speed based on the user input; and generating the informational banner to present the text to the plurality of users at the modified speed.

8. The system of claim 1, wherein the second processor of the receiver performs further second actions when executing the second computer instructions, the further second actions comprising:

presenting a plurality of speed options on the display device to a user of the plurality of users;

receiving a user selection of a speed option from the plurality of speed options; and providing the selected speed option to the server computer to update the user profile associated with the user.

9. The system of claim 1, wherein the second processor of the receiver performs further second actions when executing the second computer instructions, the further second actions comprising:

presenting training text on the display device to a user of the plurality of users;

determining how long it took the user to read the training text; and providing an update to the determined speed included in the user profile associated with the user based on the training text and how long it took the user to read the training text.

10. The system of claim 1, wherein the second processor of the receiver performs further second actions when executing the second computer instructions, the further second actions comprising:

presenting the text on the display device to the plurality of users at a default speed;

receiving images of a user's face while the text is being presented to the plurality of users;

analyzing the received images to determine when the user is reading the text at the default speed based on eye movement of the user;

providing an update to the determined speed included in the user profile associated with the user based on at least one of the eye movement of the user or facial features of the user while the user is reading the text.

11. The system of claim 1, wherein determining the speed at which to present the text to the user includes:

determining at least one characteristic associated with the text;

selecting the speed at which to present the text to the user from a plurality of speeds based on the at least one characteristic associated with the text.

12. A method, comprising:

receiving video content having program content to present to a plurality of users;

receiving text to present along with the video content to the plurality of users;

storing a plurality of profiles for the plurality of users, wherein each corresponding profile includes a plurality of characteristics that are each assigned a reading-speed value;

identifying a first user of the plurality of users and a second user of the plurality of users in which to whom to present the video content and the text;

determining a first speed at which to present the text to the first user based on a first aggregated score calculated from the assigned reading-speed values in the corresponding profile for the first user;

determining a second speed at which to present the text to the second user based on a second aggregated score calculated from the assigned reading-speed values in the corresponding profile for the second user;

determining a combined speed at which the present the text to the first and second user based on the first speed and the second speed; and presenting, along with the video content, the text to the first user and the second user at the combined speed.

13. The method of claim 12, further comprising:

receiving an update to the text;

determining an updated speed at which to present the updated text; and presenting, along with the video content, the updated text at the updated speed.

14. The method of claim 12, wherein presenting the text to the first and second users at the combined speed includes:

scrolling the text horizontally across a display screen in an informational banner at the combined speed.

15. The method of claim 12, wherein presenting the text to the first and second users at the combined speed includes:

scrolling the text vertically across a display screen overlaid on at least a portion of the video content at the combined speed.

16. The method of claim 12, wherein determining the combined speed at which to present the text to the first and second users includes:

determining a first priority of the first user;

determining a second priority of the second user; and selecting the first speed as the combined speed in response to the first priority being higher than the second priority or selecting the second speed as the combined speed in response to the second priority being higher than the first priority.

17. The method of claim 12, wherein the presenting of the text to the first and second users includes:

generating an informational banner to present the text at the target speed;

combining the informational banner with the video content; and presenting the combined video content and the informational banner to the display device to present the text to the first and second users at the target speed.

18. The method of claim 12, further comprising:

presenting a plurality of speed options to the first user;

receiving a user selection of a speed option from the plurality of speed options; and setting, in the corresponding profile of the first user, the first speed at which to present the text to the first user based on the received user selection.

19. The method of claim 12, further comprising:

presenting training text to the first user;

determining how long it took the first user to read the training text; and setting, in the corresponding profile of the first user, the first speed at which to present the text to the first user based on the training text and how long it took the first user to read the training text.

20. The method of claim 12, further comprising:

presenting the text to the first user at a default speed;

receiving images of the first user's face while the text is being presented to the first user;

analyzing the received images to determine when the first user is reading the text at the default speed based on eye movement of the first user;

setting, in the corresponding profile of the first user, the first speed at which to present the text to the first user based on at least one of the eye movement of the first user or facial features of the first user while the first user is reading the text.

21. The method of claim 12, further comprising:

determining at least one characteristic associated with the text;

wherein determining the first speed at which to present the text to the first user includes modifying the first speed at which to present the text to the first user on the at least one characteristic associated with the text.

22. A receiver, comprising:

a memory that stores computer instructions; and a processor that performs actions when executing the computer instructions, the actions including:

receiving a first data stream having video content to present to a plurality of users;

receiving a second data stream having text to present along with the video content to the user;

determining at least one reading characteristic of each respective user of the plurality of users;

assigning a reading-speed value to each of the at least one reading characteristic for each respective user of the plurality of users;

determining a reading speed for each respective user of the plurality of users based on an aggregated score calculated from the reading-speed values of the plurality of characteristics for the respective user;

determining a speed at which to present the text to the user based on a combination of the reading speed of each respective user;

generating, based on the second data stream and the determined speed, a third data stream having an informational banner to present the text to the plurality of users at the determined speed;

combining the first data stream and the third data stream; and providing the combined first and third data stream to a display device to present the text at the determined speed along with the video content to the plurality of users.

23. The receiver of claim 22, further comprising:

wherein determining the at least one reading characteristic of each respective user of the plurality of users includes:

determining a native reading language of each respective user; and determining a language of the text; and wherein determining the speed at which to present the text to the plurality of users includes:

selecting the speed at which to present the text to the plurality of users based on a comparison between the native reading language and the language of the text.

* * * * *